United States Patent Office 3,297,754
Patented Jan. 10, 1967

3,297,754
N-METAL SALTS OF α,α-DISUBSTITUTED β-HALO PROPIONIC ACID AMIDE AND PREPARATION THEREOF
Adriaan Bantjes, Wilmington, Del., assignor to E. I. du Pont de Nemours and Company, Wilmington, Del., a corporation of Delaware
No Drawing. Filed Apr. 9, 1963, Ser. No. 271,598
5 Claims. (Cl. 260—561)

This invention relates to a novel process for preparing polyamides from α,α-disubstituted-β-halopropionic acid amides by way of β-lactams.

β-Lactams, which are the inner cyclic amides of β-amino acids, are not normally made directly from the amino acid. The parent compound of the β-lactam series, β-propiolactam, is made by the action of a Grignard reagent upon β-aminopropionic esters. β-Lactams bearing a hydrogen atom on the nitrogen, but having hydrocarbon groups on the α or β-carbon atoms, are also made by the same Grignard method, or by action of base upon β-aminopropionic acid chlorides, or from olefins by a process as described in German Patent 1,086,234. These methods are not desirable routes to β-lactams, particularly those having two substituents on the α-carbon atom, because of the costly raw materials or uneconomic yields.

This invention is concerned with polymers derived from α,α-disubstituted β-amino acid units and with methods for preparing said polymers. Such polymers are particularly stable to hydrolytic, thermal, and photo degradation because attack on the amide linkage is hindered sterically and because the NH group is neopentyl and is not subject to β-elimination reactions.

Polyamides comprising units of β-amino acids having two α-substituents have a desirable combination of properties that renders them attractive for commercial production of fibers for apparel and other uses. Selected members of these polyamides have melting points less than 300° C. which are sufficiently low to permit melt-spinning into fibers, but at the same time high enough to permit normal apparel usage. These selected members are those polymers in which the α-substituents are alkyl. The higher melting members, those melting above 300° C., can be fabricated by solution-spinning from, for example, methanolic calcium thiocyanate, formic acid, m-cresol, sulfuric acid, trifluoro acetic acid, and chloroform.

It is an object of this invention to provide a new route to polyamides having two substituents on the α-carbon atom. Another object is to prepare a high melting form of poly(pivalamide) which is melt-spinnable and is characterized by being soluble in chloroform.

Another object is to provide a new and convenient synthesis of β-lactams having two alkyl groups on the α-carbon atom uncontaminated with β,β-disubstituted isomers.

A further object is to provide a rapid, high yield synthesis of high molecular weight, fiber-forming polyamides from β-halopropionic acids having two substituents on the α-carbon atom.

Another object is to prepare the N-alkali or alkaline earth metal salts of α,α-disubstituted-β-halopropionamides.

This invention provides a process for preparing fiber-forming high molecular weight linear polyamides comprising units of β-amino acids having two hydrocarbon or monochloromethyl groups on the α-carbon atoms only, without any β,β-isomer, from α,α-disubstituted-β-halopropionic acid amides. The process may be accomplished by reaction of selected alkali or alkaline earth metal salts of weakly acidic compounds with the haloamide in certain polar organic solvents and at elevated temperatures to form the β-lactam, and then polymerizing said lactam in the presence of a catalyst in selected polar organic solvents free of active hydrogen to form the polyamide. Alternatively, the haloamide may be converted to the N-alkali metal salt or N-alkaline earth metal salt by reaction with the alkali or alkaline earth metal salt in liquid diluent. The N-metal salt of the haloamide may be cyclized by heat in certain polar solvents with elimination of metal halide to form the β-lactam which may be polymerized as before. In a preferred embodiment, the α-carbon is fully substituted by two monovalent alkyl groups or one divalent polymethylene group.

These novel alkali or alkaline earth metal salts and the polyamides formed by the process of this invention are produced by the following reactions:

(a) an α,α-disubstituted β-halopropionic    an α,α-disubstituted
    acid amide                                  β-lactam $$n\ X-CH_2-\underset{\underset{R'}{|}}{\overset{\overset{R}{|}}{C}}-CONH_2 + (R'')_nM \rightarrow n\ \begin{array}{c} H_2C-\overset{R}{\underset{|}{C}}-R' \\ |\ \ \ \ \ \ \ | \\ H-N-C=O \end{array} + M(X)_n$$

an alkali or alkaline earth metal
salt of the β-haloamide $$(X-CH_2-\underset{\underset{R'}{|}}{\overset{\overset{R}{|}}{C}}-CONH)_nM + nR''H$$

(b) an α,α-disubstituted-β-lactam             a polyamide $$m\ \begin{array}{c} H_2C-\overset{R}{\underset{|}{C}}-R' \\ |\ \ \ \ \ \ \ | \\ H-N-C=O \end{array} \rightarrow \left(\begin{array}{c} \ \ \ \ \ \ \ \ R\ \ O \\ \ \ \ \ \ \ \ \ |\ \ \ || \\ N-CH_2-C-C- \\ |\ \ \ \ \ \ \ \ | \\ H\ \ \ \ \ \ R' \end{array}\right)_m$$

In the above formulas, M represents an alkali or alkaline earth metal, preferably lithium, sodium, potassium or calcium; X represents a halogen, preferably chlorine or bromine; R" represents hydrogen, a tertiary alkoxy group of no greater than six carbon atoms such as t-butoxy, or hydrocarbon of up to twenty carbon atoms; R and R' which may be different represent monochloromethyl, phenyl, alkyl or cycloalkyl radicals of no more than six carbon atoms each, and may together form an alicyclic hydrocarbon ring incorporating the α-carbon atom; $n$ is equal to the valence of M, i.e., 1 or 2, and $m$ is a whole number sufficiently large that the polyamide is fiber forming.

A coupled process which is of particular value for the formation of the polyamides and in which the metal salt of the amide is not isolated, is accomplished by the use of selected polar organic solvents free of active hydrogen as the reaction media. Useful solvents for this purpose are liquid under the reaction conditions and dissolve the amide, the N-alkali metal salt of the amide, and the lactam, and have at least a swelling action on the polyamide, but do not otherwise react with the solutes; the solvents may or may not also dissolve the alkali halide (MX) formed in the first reaction. The preferred solvents are those distillable cyclic lactams which have a lower alkyl group on the nitrogen atom, such as N-methyl pyrrolidone and N-methyl caprolactam and linear amides of the type $R_1CO\text{—}NR_2R_3$ where $R_1$=lower alkyl having 1, 2, or 3 carbon atoms and $R_2$ and $R_3$=lower alkyl having 1, 2, or 3 carbon atoms or a ring composed of these units and the nitrogen, and boiling within the range 165–400° C.

The $\beta$-halo amides used as the starting materials for the process of this invention may be prepared from $\beta$-halo acids by the well-known sequence of converting the acid to the acid chloride with thionyl chloride or a phosphorus chloride, followed by reaction of the resulting acid chloride with aqueous ammonia, in a manner similar to that described in "Organic Syntheses," Collective Volume III, pages 490–492, for the preparation of isobutyramide. Halopivalamides may be made from monochloro trimethyl acetonitrile, whose preparation from trimethyl acetonitrile is described in British Patent 608,806, followed by conversion of the nitrile group to an amide group using hydrogen peroxide according to the general procedure described in "Organic Syntheses," Collective Volume II, page 586. The $\alpha,\alpha$-disubstituted-$\beta$-halopropionic acids may be made by the general procedure disclosed in French Patent 1,231,163 from $\beta$-hydroxy aldehydes obtained by condensation of formaldehyde or other aldehydes with $\alpha,\alpha$-disubstituted acetaldehydes (e.g., isobutyraldehyde). These $\beta$-halo acids may also be made by the action of a hydrogen halide upon the $\beta$-hydroxy acids obtained by saponification of the ester formed in the self-condensation of $\beta$-hydroxy aldehydes. A self-condensation of this type has been described by Finch in the Journal of Organic Chemistry, vol. 25, page 2219 (1960), for $\alpha,\alpha$-dimethyl-$\beta$-hydroxy propionaldehyde.

The alkali or alkaline earth metal derivatives used for preparing the lactams or the $\beta$-haloamide salts are the salts of replaceable hydrogen compounds having acid strengths lower than or equal to tertiary-butanol. They are prepared, for example, by reacting a tertiary alcohol with an alkali metal, and include substances such as potassium tertiarybutoxide and the sodium salt of 2-methyl-2-butanol or metal derivatives of weakly acidic compounds such as sodium hydride, sodium triphenylmethane, and sodium naphthalene. The alkoxides employed are those derived from tertiary alcohols which boil at least 20° C., preferably at least 40° C., below the lactam, to facilitate separation therefrom prior to the polymerization. Equivalent amounts of alkali or alkaline earth metal derivatives and $\beta$-halopropionic acid amide are normally employed. Sodium methoxide and similar salts of primary alcohols are not suitable reagents for effecting closure of the lactam ring, simple displacement of the $\beta$-halogen by n-alkoxy taking place in preference to dehydrohalogenation to lactam.

Polymerization of the lactams is effected with a strongly basic polymerization catalyst, such as for example, sodium hydride and optionally may include an acyl promoter such as acetic anhydride. Other illustrative catalysts are alkali lactamates, alkali tertiary-alkoxides, and alkali aryls and alkyls. They may be present in amounts of between about 0.001 and 0.02 mole per mole of lactam. Other acyl promoters are acetyl chloride, cyanuric chloride, and oxalyl chloride and are normally employed in amounts of between $5\times10^{-5}$ and $1\times10^{-3}$ mole based on the lactam.

That the N-alkali or alkaline earth metal salts of the $\beta$-halopropionamides are indeed intermediates in the preparation of the propiolactams of this invention can be demonstrated by the isolation of such salts and conversion of these to lactams by heating in a water-free inert medium at temperatures of 60° to 140° C. The lactam may be isolated by removal of the solvent followed by distillation. In one embodiment of this invention the N-alkali or alkaline earth metal salts are isolable by reaction of the $\beta$-halopropionamide with sodium hydride at room temperature in a solvent of low polarity such as benzene, the N-alkali metal salt being isolated by filtration and characterized by elemental analysis. Subsequent heating alone or in the presence of a solvent which does not contain a reactive hydrogen converts the salt to lactam and metal halide. The lactam may be polymerized by any of the processes subsequently described.

Preparation of the $\beta$-lactams from the $\beta$-haloamides without separation of any intermediate metal salt may be carried out at temperatures in the range of 20–150° C., preferably at 70–120° C. The $\beta$-lactam and any active hydrogen containing solvent which is present are then codistilled as rapidly as the lactam is formed in order to avoid polymerization of the lactam in this medium. The reaction can be run under vacuum so that the lactam distills out as rapidly as it is formed, absolute pressures of 0.1–20 mm. mercury being used. The temperature of the reaction mixture is maintained at 20–100° C. above the boiling point of the lactam product at the pressure being used. For the preparation of $\alpha,\alpha$-dimethyl-$\beta$-propiolactam, the reaction mixture is suitably maintained at 90–110° C. at 5–10 mm. mercury absolute pressure.

One important aspect of the present invention is the use of certain polar solvents in the formation of $\beta$-lactams from the $\alpha,\alpha$-disubstituted-$\beta$-halopropionic acid amide. Such polar solvents have dipole moments in excess of 1.55 Debye units when measured at or below 20° C. and are those selected from the group consisting of N,N-disubstituted amides, ethers, N-alkyl cyclic lactams, tertiary alcohols, and dialkyl sulfoxides. The use of non-polar solvents such as benzene or toluene in this step of the process gives rise to an impurity which is $\beta$-hydroxy-$\alpha,\alpha$-disubstituted propionitrile, which, unless removed prevents attainment of high molecular weight polymer. In the case of pivalolactam preparation in non-polar solvents, the impurity is hydroxypivalonitrile. Surprisingly, none of this impurity is formed when the solvents are the more polar tetrahydrofuran or dimethyl acetamide. In the event some small amount of impurity is formed, it is so insignificant that it does not interfere with the polymerization process and therefore need not be removed. This is of importance since separation and removal of the undesired nitrile is difficult and costly as exemplified in some of the examples which follow.

In carrying out the ring-closure step, haloamide is first dissolved or suspended in the selected polar organic solvents described, in a vessel equipped with means for stirring. The mixture is then brought to the desired operating temperature and pressure. A separate solution of the alkoxide in the same organic solvent or slurry of metal hydride or metal alkane is gradually run into the stirred amide solution. The lactam produced distills out substantially as rapidly as it forms along with a portion of the solvent. The lactam may then be isolated from the distillate mixture by fractional distillation. In order to facilitate removal of the lactam as rapidly as it is formed, and to permit facile separation of the lactam from the polar solvent by fractional distillation when so desired, it is preferable to use a solvent having a boiling point at least 20° different from that of the lactam, at pressures suitable for their separation. By carrying out the lactam-forming reaction under conditions such that the solvent also vaporizes, the purging action of the vaporizing solvent facilitates removal of the lactam as quickly as it is generated.

Polymerization of the lactam is carried out with a solution thereof in a polar organic solvent not possessing a labile hydrogen atom. The quantity of solvent employed in this step as well as in the aforementioned operations is not critical. A sufficient amount of solvent (preferably from 1 to 15 vol. of solvent per vol. of β-lactam) to achieve solution of the reactants and product and thus provide a suitable reaction medium is normally employed. The presence of excessive amounts of solvent are uneconomical since costly removal is then required and the molecular weight of the obtained polymer is lower.

The solution is maintained at a temperature in the range of 20–90° C., preferably 40–70° C., for a period of 0.2 to 10 hours to effect the polymerization. Formation of the polymer converts the solution to a gel-like mass. The polymer is isolated from the polymerization medium by mixing with a liquid, such as water, which is a non-solvent for the polymer, but which is miscible with the solvent. The resulting crumblike polymer particles are readily filtered and washed, giving a substantially quantitative yield of polymer that is suitable for conversion to shaped structures, such as fibers, without further purification.

In one further embodiment of this invention, wherein the alkali or alkaline earth metal salt of the haloamide is converted to the lactam, the formation of the lactam and its polymerization may be carried out in the same solvent without intermediate isolation of the salt or the lactam from the solvent. The lactam solution distillate that is obtained from the first step is purified by fractional distillation to remove impurities such as any tertiary alcohol by-product formed in the ring closure. It is generally sufficient to merely distill out the by-products from the lactam solution, the latter then being sufficiently pure for direct preparation of high-quality polyamide. The catalyst and promoter are merely added to the solution at the desired polymerization temperature, and held there until formation of the polyamide is complete.

Although a variety of polar organic solvents free of active hydrogen may be used in the polymerization step of this invention, N-lower-alkyl derivatives of lactams having 4 to 7 members in the ring are preferred. Lactams of this type include N-methyl azetidinone-2, N-methyl - pyrrolidone - 2, N-ethyl-pyrrolidone-2, N-butyl-pyrrolidone-2, N-methyl-piperidone-2, N-ethyl-piperidone-2, N - propyl - pyrrolidone - 2, N - methyl-ω-caprolactam, N-ethyl-ω-caprolactam, N-propyl-ω-caprolactam, and the like. Other polar organic solvents that may be used include dimethyl sulfoxide, hexamethylphosphoramide, and dimethylacetamide. The use of relatively non-polar solvents such as benzene, petroleum ether, cyclohexane, etc., or no solvent at all, gives only low molecular weight polyamide in the polymerization step.

The α,α-disubstituted-β-halopropionic acid amides which may be converted to the alkali metal salts of the haloamides and to polymerizable lactams according to this invention include those derived from α,α-dimethyl-β-halopropionic acids (also known as halo-pivalic acids), α,α-diethyl-β-halopropionic acids, α,α-dipropyl-β-halopropionic acids, α,α-dibutyl-β-halopropionic acids; mixed dialkyl acids such as α-methyl-α-ethyl-β-halopropionic acids; cycloalkanes bearing both a carboxylic acid group and a halomethyl group on the same carbon atom, such as 1-halomethylcyclobutanecarboxylic acides, 1-halomethylcyclopentanecarboxylic acids, 1-halomethylcyclohexanecarboxylic acids, 1 - halomethylcycloheptanecarboxylic acids, and 1-halomethylcyclooctanecarboxylic acids; α,α-diphenyl-β-halopropionic acids, α,α-di-p-tolyl-β-halopropionic acids; and α-alkyl-α-aryl-β-halopropionic acids wherein the alkyl and aryl groups are those disclosed herein.

The above process is of particular value in converting the α,α-disubstituted lactam to its polymer exclusive of the β,β-isomer. The polymer made from α,α-dimethyl lactam is found to be highly crystalline, soluble in chloroform, and has a crystalline melting point of not less than 260° C. and in most instances melts at 273–274° C. as determined by X-ray hot camera method and by differential thermal analytical methods.

Although not intended to limit the scope thereof in any way, the following examples serve to illustrate this invention.

*Example I*

Bromopivalic acid, which is prepared by the procedure described by Backer et al. in Recueil des travaux chimiques des Pays-Bas, vol. 55, page 897 (1936) is refluxed with thionyl chloride to form bromopivaloyl chloride. The latter is isolated from the reaction by fractional distillation and subsequently converted to β-bromopivalamide through the action of aqueous ammonia, in a manner similar to that described in "Organic Syntheses," Collective Volume III, pages 490–492, for the preparation of isobutyramide from isobutyric acid. The β-halo amides employed in the remaining examples are prepared from the respective β-halo acids, by the same reaction sequence unless otherwise noted.

A solution of 36 grams (0.20 mole) of β-bromopivalamide and 22.6 grams (0.20 mole) of potassium tertiary-butoxide in 100 ml. of N-methylcaprolactam is heated in a dry nitrogen atmosphere at 100° C. for 45 minutes. The tertiary butanol formed is removed by vacuum distillation and the residual product, 3,3-dimethyl azetidinone-2, and the solvent are then codistilled in vacuo at 100–110° C./13 mm. The distillate is separated into the two components by gas chromatography or by fractional distillation in an effective distillation column to yield 17 grams (0.017 mole) of the pivalolactam.

*Example II*

The Example I procedure is utilized in effecting a reaction between 28.0 grams of β-chloropivalamide (0.20 mole), which is prepared from chloropivalic acid made according to U.S. Patent 2,302,228 and 22.6 grams of potassium tertiary-butoxide (0.20 mole) in 100 ml. of N-methylcaprolactam. This solution is heated in a dry nitrogen atmosphere at 120° C. for 2 hours at atmospheric pressure. Separation of the components contained in the reaction vessel by the procedures of Examples I yields a major portion of N-methylcaprolactam and 13 grams of pivalolactam (0.13 mole), $n_D^{25}$ 1.449.

*Example III*

75.8 grams (0.36 mole) of α,α-diethyl-β-bromo-propionamide, which is prepared from α,α-diethyl-β-bromopropionic acid made by the method disclosed in French Patent 1,231,163 are refluxed in a nitrogen atmosphere with 40.8 grams (0.36 mole) of potassium tertiary-butoxide in 500 ml. of tertiary-butanol for 45 minutes. The solution is filtered and the clear filtrate is distilled to separate the major portion of the tertiary butanol from the lactam. The lactam-rich residue is then fractionated to yield 41 grams (0.32 mole) of 3,3-diethyl-azetidinone-2, B.P. 79–82° C./0.5 mm., $n_D^{25}$ 1.461.

*Example IV*

The influence of the kind of solvent and basic reagent upon the ring-closure of β-haloamides to β-lactams is shown in a series of experiments utilizing a variety of said solvents and reagents.

The general procedure shown in Examples I and II is used in carrying out this series of experiments, in which either β-chloropivalamide (Items 16–19) or β-bromopivalamide (Items 1–15) is converted to pivalolactam. The main features of these experiments are summarized in the following table.

TABLE I.—PIVALOLACTAM FROM HALO PIVALAMIDES

| Item | Amount Amide (g.) | Basic Reagent | Amount Basic Reagent (g.) | Solvent | Amount Solvent (ml.) | Time (min.) | Temp., °C. | Weight Lactam (g.) | Percent Yield |
|---|---|---|---|---|---|---|---|---|---|
| 1 | 20 | LiOEt | 7.3 | NMC | 200 | 120 | 100 | 0.6 | 5 |
| 2 | 18.1 | NaH a | 5 | Benzene | 150 | 15 | 81 | 3.7 | 37 |
| 3 | 36.2 | NaH a | 10 | do | 450 | 720 | 81 | 10.3 | 52 |
| 4 | 36.2 | NaH a | 10 | Toluene | 500 | 240 | 111 | 9.7 | 49 |
| 5 | 18.1 | Amberlite IRA-400 | 50 | NMP | 150 | 720 | 135 | (b) | (b) |
| 6 | 18.1 | CaH₂ | 2.1 | Benzene | 100 | 720 | 81 | (b) | (b) |
| 7 | 36.2 | NaH a | 10 | Dioxane | 150 | 240 | 102 | 8.6 | 43 |
| 8 | 18.1 | Li₂CO₃ | 3.7 | DMF | 100 | 420 | 156 | (b) | |
| 9 | 18.1 | NaH a | 5.0 | TMSO | 100 | 60 | 150 | (b) | |
| 10 | 18.1 | Tribenzyl Amine | 28.7 | | | 180 | 180 | (b) | |
| 11 | 36.0 | Potassium tert.-butoxide | 22.6 | Tert.-butanol | 250 | 150 | 83 | 16.1 | ᶜ 86 |
| 12 | 36.2 | NaH a | 10 | do | 500 | 300 | 83 | 17.8 | 90 |
| 13 | 36.0 | Potassium tert.-butoxide | 22.6 | NMC | 100 | 45 | 100 | 17.0 | 86 |
| 14 | 36.2 | do | 22.6 | Benzene | 475 | 180 | 81 | 13.0 | 65.5 |
| 15 | 18.1 | do | 11.3 | DMSO | 100 | 25 | 100 | 6.8 | 68 |
| 16 | 34 | NaH (53.5% in Mineral Oil) | 8.9 | Toluene | 500 | 30 | 111 | 2.5 | 9 |
| 17 | 26.9 | Potassium tert.-butoxide | 22.6 | Tert.-butanol | 250 | 300 | 83 | 9.4 | ᶜ 60 |
| 18 | 75 | Sodium tert.-amylate | 59 | Tert.-amyl alcohol. | 225 | 240 | 120 | 37 | 68 |
| | | | | DMAC | 200 | | | | |
| 19 | 28 | Potassium tert.-butoxide | 22.6 | NMC | 100 | 120 | 120 | 13 | 66 |

ᵃ 47% in mineral oil.
ᵇ No reaction.
ᶜ Based on recovery of starting material.

Abbreviations: NMC—N-methyl caprolactam
DAMC—Dimethylacetamide
TMSO—Tetramethylene sulfone
DMF—Dimethylformamide
DMSO—Dimethylsulfoxide
NMP—N-methylpyrrolidone-2

*Example V*

A reaction mixture composed of 20 grams (0.091 mole) of α,α - pentamethylene-β-bromopropionamide, which is prepared from α,α-pentamethylene-β-bromopropionic acid made by the procedure described in French Patent 1,231,163, 10.7 grams (0.096 mole) of potassium tertiary-butoxide, and 500 ml. of dry tertiary-butanol is refluxed for 1 hour under a nitrogen atmosphere. The potassium bromide formed during the reaction is removed by filtration and the tertiary-butanol is removed from the filtrate by distillation under reduced pressure. The residue, composed of the virtually pure β-lactam, is purified by recrystallization from benzene/heptane (1/5 volume ratio) or by sublimation in vacuo at 70–75° C./0.2 mm. to yield 11.3 grams (0.081 mole) of 3,3-pentamethylene-β-propiolactam, M.P. 73.5–75° C.

*Example VI*

To 22 grams (0.073 mole) of α,α-diphenyl-β-bromopropionamide which is made by the method described by Zaugg et al. in the Journal of the American Chemical Society, vol. 72, page 3006 (1950), dissolved in 100 ml. of tertiary-butanol, is added 11.8 grams (0.11 mole) of anhydrous potassium tertiary butoxide. The mixture is stirred and refluxed in a nitrogen atmosphere at 85° C. for 45 minutes. The milky white liquid is then filtered to remove the potassium bromide formed and the tertiary-butanol is removed from the filtrate by distillation under reduced pressure. The residue, a slightly yellow solid, is recrystallized from benzene in the presence of an active carbon decolorizer ("DARCO") to yield 10.6 grams (0.048 mole) of 3,3-diphenylazetidinone-2 as colorless crystals, M.P. 171° C. It is to be noted that use of an excess of potassium tertiary butoxide resulted in a lower yield of β-lactam in comparison to those examples in which the ring-closure reagent and the haloamide are present in equimolar quantities.

*Example VII*

A solution is prepared in an atmosphere of dry nitrogen from 4 grams pivalolactam, .025 gram sodium hydride, and 10 ml. N-methyl-pyrrolidone-2. This solution is then kept at 60° C., for 3.75 hr. The resulting gel-like mixture is then stirred with water to convert the poly(pivalamide) that has been formed therein to a particulate form. After being removed by filtration, washed with water, and dried, the polyamide weighs 3.8 grams and has an inherent viscosity in m-cresol solution (0.5%) of 0.70.

*Example VIII*

A solution is prepared in an atmosphere of dry nitrogen from 10 grams of 3,3-pentamethylene azetidinone-2, 25 ml. of N-methyl caprolactam, and 250 mg. of a 47% sodium hydride suspension in paraffin oil. This solution is then kept at 65° C. for 4 hr. The polymer, 2,2-pentamethylene-3-polyamide, is then precipitated by the addition of 500 ml. of water. The polyamide, removed by filtration, washed with water, and dried, weighs 9.1 grams. The polymer has a crystalline melting point of 275° C. and an inherent viscosity in m-cresol solution of 1.43.

*Example IX*

To a solution of 15 grams of pivalolactam in 120 grams of freshly distilled hexamethylphosphoramide is added 100 mg. of sodium hydride and, following the disappearance of the sodium hydride, 2 drops of acetic anhydride. The solution is kept in a closed flask at 65° C. for 4 hours, during which period the solution becomes very viscous. The poly(pivalamide) is precipitated by the addition of water, removed by filtration, washed with water, and dried to a weight of 14.5 grams. The polymer has a crystalline melting point of 273° C. and an inherent viscosity in m-cresol (0.5%) of 2.12.

Table II, below, contains representative fiber data for fibers obtained by press spinning poly(pivalamide) (inherent viscosity 2.1, 0.5% in m-cresol) at 280–288° C. and by winding up the fiber at a speed of 300–315 yd./min. The fibers were extruded into a bath containing silicone oil Dow 555, serving as a quench and as a protective coating. Finally the extruded fiber is drawn 1.1X at 120° C.

TABLE II.—FIBER DATA FOR POLY(PIVALAMIDE)

| Conditions (All Samples Boiled Off) | Tenacity, grams/denier | Elongation, percent | Initial Modulus, grams/denier |
|---|---|---|---|
| 21° C., 65% R.H. | 3.3 | 40 | 73 |
| 21° C., wet | 3.1 | 45 | 7 |
| 100° C., air | 2.5 | 28 | 23 |
| 100° C., wet | 1.7 | 34 | 5 |

These fibers are non-yellowing after a 700-hour light-stability test and display only a 44% drop in inherent viscosity after this lengthy testing. The light-stability test is performed in an Atlas Color Fade-Ometer, Model FDA-R, in which the carbon arc is replaced by a xenonfilled lamp, type Osram XBF–6000, which is water cooled and has a minimum coolant flow of 6 liters per minute, an A.C.-current supply voltage of 220 volts, an operating voltage of 135 volts, an operating amperage of 45 amperes, and a rated power of 6000 watts. The fiber samples are placed on 91 lb. Bristol Index cardboard strips which are placed on the rotating framework of the Fade-Ometer at a distance of 10 inches from the center of the lamp. The temperature surrounding the fiber samples is 145±5° F. In this modified device the fibers are subjected to a light-stability test that is 2–3 times as severe as that resulting from the use of the carbon arc light source.

The hydrolytic stability of the polymer is excellent, and the polymer stands a 4-hour boiling test in 10% sodium hydroxide solution without any weight loss or loss in inherent viscosity.

Example X

To 27 grams of 3,3-diethylazetidinone-2 dissolved in 40 ml. of hexamethylphosphoramide is added 100 mg. of sodium hydride and, when the latter is dissolved, 2 drops of acetic anhydride. This solution is kept between 65–70° C. for 48 hours. The resulting viscous solution is then agitated with water in an Osterizer-type blender to form a white, polymeric precipitate which, following isolation, washing, and drying, weighs 20.2 grams, possesses a melting point of 205° C., and has an inherent viscosity of 0.73.

The polymer can be press spun at 210° C. at a wind-up speed of 275 ft./min. into fibers which on drawing 4.5X at 68–70° C. showed the physical properties tabulated below in Table III.

TABLE III.—FIBER DATA FOR POLY $(\alpha,\alpha$-DIETHYL-$\beta$-AMINOPROPIONIC ACID

| Conditions (All Samples Boiled Off) | Tenacity, grams/denier | Elongation, percent | Initial Modulus, grams/denier |
|---|---|---|---|
| 21° C., 65% R.H. | 2.2 | 34 | 56 |
| 21° C., wet | 1.9 | 33 | 44 |
| 90° C., air | 1.3 | 32 | 7 |
| 90° C., wet | 1.1 | 30 | 5 |

Example XI

A solution of 40 ml. of N-methyl caprolactam containing 3.8 grams of pivalolactam is subjected to ring opening polymerization by the addition of 50 mg. of sodium hydride (in a 47% suspension in mineral oil), with heating being maintained at 65° C. for 24 hours under a nitrogen atmosphere. The poly(pivalamide) thus obtained weighs 3.6 grams and has an inherent viscosity of 1.45.

Example XII

This example shows the preparation and polymerization of pivalolactam in solution without intermediate separation therefrom.

A solution is prepared from 3.6 grams of the amide of bromopivalic acid and 12 ml. of N-methylcaprolactam in a 50–ml. glass flask; 2.26 grams of finely powdered potassium tertiary-butoxide is then added to that solution. The resulting mixture becomes opaque and warm. The reaction is completed in the course of distilling the mixture to dryness at 90–110° C./8 mm., the small amount of tertiary-butanol being separated by fractionation. The distillate remaining consists of about 13 ml. of a colorless liquid containing pivalolactam. Most of the distillation residue is readily water-soluble; the material that does not dissolve is .35 gram of polypivalolactam.

The lactam contained in the distillate is converted to a polyamide by adding .030 gram sodium hydride and maintaining the temperature at 50° C. for 2 hr. under a nitrogen atmosphere. The poly(pivalamide) formed thereby is isolated from the viscous reaction product by stirring with water; it weighs 1.45 grams after washing and drying, and melts at about 260° C. This polyamide is combined with the 0.35 gram quantity isolated from the distillation residue; the resulting mixture is purified by dissolving in formic acid with the application of heat, filtering, and then re-precipitating by the addition of water. The resulting polymer has an inherent viscosity of 0.64 measured in m-cresol solution at 0.5% concentration, and forms coherent films when cast from formic acid solution.

Example XIII

A solution of 30 grams (0.14 mole) of $\alpha,\alpha$-diethyl-$\beta$-bromopropionamide in 150 ml. of N-methyl caprolactam is heated in vacuo (0.3 mm. Hg pressure) to the boiling point of the N-methyl caprolactam. A solution of 16.2 grams (0.14 mole) of potassium tertiary-butoxide in 100 ml. of N-methyl caprolactam is then added, in 10-ml. portions, to the amide solution and the N-methyl caprolactam is allowed to distill rapidly at 90–100° C. together with the 3,3-diethylazetidinone-2 that is formed. The tertiary-butanol is stripped from the distillate and the $\beta$-lactam is then polymerized in the residual solution to yield 16.1 grams of poly($\alpha,\alpha$-diethyl-$\beta$-aminopropionic acid).

Example XIV

All operations described below are carried out in a dry-box under nitrogen at room temperature.

(a) *Sodium salt of chloropivalamide.*—13.55 grams (0.1 mole) of chloropivalamide are dispersed in 200 ml. dry ethyl ether in an atmosphere of dry nitrogen and 4.75 grams (0.1 mole) of a 50.6% sodium hydride dispersion in paraffin oil are added in small portions. A vigorous evolution of hydrogen results and from the initially nonviscous solution, which is stirred magnetically, the sodium salt of chloropivalamide precipitates in a period of two minutes. The salt is removed by filtration and washed with dry ethyl ether and petroleum ether. The yield is 13.0 grams (0.082 mole).

*Analysis.*—Calculated for $C_5H_9NOClNa$: percent C, 38.1; percent H, 5.8; percent N, 8.6. Found: percent C, 38.2; percent H, 5.7; percent N, 8.9.

(b) *Sodium salt of bromopivalamide.*—The procedure of (a) was employed but with the following reagents:

18.0 grams (0.1 mole) of bromopivalamide,
4.47 grams (0.1 mole) of a 50.6% sodium hydride dispersion in paraffin oil,
200 ml. dry ether. The yield is 17.6 grams (0.087 mole).

*Analysis.*—Calculated for $C_5H_9NOBrNa$: percent N, 6.9; percent Br, 39.5. Found: percent N, 6.7; percent Br, 39.4.

(c) *Potassium salt of bromopivalamide.*—The procedure of (a) was employed but with the following reagents:

18.0 grams (0.1 mole) of bromopivalamide,
11.3 grams (0.1 mole) of potassium tertiary-butoxide in 400 ml. dry ether. The yield is 6.8 grams (0.031 mole), the lower yield due to the higher solubility of the potassium salt in ether.

*Analysis.*—Calculated for $C_5H_9NOBrK$: percent C, 27.5; percent H, 4.2; percent N 6.2. Found: percent C, 27.5; percent H, 4.5; percent N, 6.4.

The potassium salt of chloropivalamide is obtained in an identical procedure from chloropivalamide and potassium tertiary-butoxide, as are the alkali and alkaline earth metal salts of other $\beta$-halo-$\alpha,\alpha$-disubstituted-propionamides wherein the $\alpha$-position substituents are hydrocarbon groups which may be the same or different.

Example XV

A solution of 3.5 grams (0.018 mole) of the potassium salt of bromopivalamide in 18 ml. of N-methylcaprolactam is heated at 90–100° C. for 25 minutes to produce 3,3-dimethyl-azetidinone-2 by ring closure. This product is codistilled in vacuo with the solvent at 100–110° C./13 mm. Separation of the components by fractional distillation yields 1.7 grams (0.017 mole) of pivalolactam.

The process of this invention may not only be utilized in batch-type and semi-continuous operation, as illustrated in the above examples, but also in a fully continuous fashion, without departing from the scope thereof. Thus, a solution or suspension of an $\alpha,\alpha$-disubstituted $\beta$-halopropionamide in a polar organic solvent not possessing a labile hydrogen atom may be introduced to a stirred, heated reaction vessel maintained under a reduced pressur and surmounted by an outlet for removing vapors. A solution of suspension or the alkoxide-type dehydrohalogenating agent is introduced into the vessel simultaneously, and at a rate substantially chemically equivalent to but not exceeding that of the haloamide. The $\beta$-lactam product vaporizes as quickly as it is formed, along with a portion of the solvent. By-product alkali halide is removed from the liquid mixture contained in the vessel by a separate continuous filtration or centrifugation procedure, from which the filtrate may be returned to the vessel directly or by addition to the liquid feed. The vapors from the vessel are led to one or more fractional distillation columns in which the vapors are separated into 2 or more components. The by-product tertiary alcohol is separated thereby, and the $\beta$-lactam is isolated in either a substantially pure state or as a solution in the polar solvent. The $\beta$-lactam is then conducted to polymerization equipment wherein it is converted to a polyamide. This polymerization is carried out in a polar solvent which is either the same as that in which the $\beta$-lactam is prepared, or a different species of polar solvent as defined in this invention. The polymerization is carried out with a series of stirred vessels, the lactam, solvent, lactam-polymerization catalyst, and (optionally) a promoter or molecular weight regulator all being added to the first vessel. The polymerizing mixture flows through the first vessel and then through one or more additional polymerizing vessels connected serially to it. The mixture containing the polyamide is withdrawn from the last vessel of the series and transferred to a polymer isolation step, from which recovered polar solvent is recycled.

Example XVI

A 2-liter three neck flask was charged with a solution of 180 g. (1.0 mole) bromopivalamide in dimethylacetamide and then cooled to 0° C. Sodium hydride, 1 mole of a 50% suspension in mineral oil, was added portionwise at 0° C. and the mixture stirred at 0° C. for 1.5 hours after the addition. The reaction mixture was then heated to 65° C. and maintained at this temperature for one hour. The solution was filtered and stripped of most of the dimethylacetamide, and then distilled. No fraction showed nitrile absorption at $4.5\mu$ in the infrared, indicating that essentially no hydroxypivalonitrile was present.

Example XVII

In a container was charged 90 g. (0.50 mole) of bromopivalamide and 1000 ml. dry benzene. Sodium hydride suspension (53.5% in mineral oil), 22.5 g., was added portionwise to the stirred mixture over a period of one hour, during which time the solution became clear and then became a thick pasty mass. The temperature of the reaction mixture was maintained between 20 and 25° C. during the addition. The mixture was then refluxed overnight. The benzene solution, isolated by filtration from precipitated solid, showed strong carbonyl absorption at $5.7\mu$, characteristic of pivalolactam. An absorption at $4.5\mu$ indicated the presence of nitrile. The solution was stripped of benzene and the residue distilled at reduced pressure to give two fractions.

| Cut | B.P.,° C. (mm.) | $n_D^{25}$ | Wt., g. |
|---|---|---|---|
| 1 | 54 (0.6) | 1.4440 | 13.6 |
| 2 | 54–6 (0.6) | 1.4435 | [1] 2.3 |

[1] Yield 52%.

Example XVIII

A number of pivalolactam preparations in benzene, toluene and tetrahydrofuran having a refractive index range $n_D^{25}$ 1.4436–1.4497 were combined to a total weight of 172 g. and fractionated through a 1-liter spinning band column. The refractive index of the mixture was $n_D^{25}$ 1.4450.

| Cut | B.P.,° C. (mm.) | Reflux Ratio | Wt., g. | $n_D^{25}$ |
|---|---|---|---|---|
| 1 | 63 (1.3) | 10–11/1 | 8.1 | 1.4479 |
| 2 | 63–63.5 (1.3–1.5) | 8–11/1 | 132.0 | 1.4445 |
| 3 | 60 (1.0) | Total take off | 37.3 | 1.4389 |

All fractions showed strong carbonyl absorption in the infrared at $5.7\mu$, characteristic of pivalolactam. Each fraction showed nitrile absorption at $4.5\mu$, the intensity of which increased markedly from cut 1 to cut 3.

Fractions 2 and 2 were polymerized in hexamethylphosphoramide in the following manner. Pivalolactam, 15 g., was mixed with 150 ml. HMPA under dry nitrogen in a 300-ml. round bottom flask previously dried by flaming under a current of dry nitrogen. Initiator, comprising 0.030 g. sodium hydride (53.5% in mineral oil) and one drop of acetic anhydride, was then added and the mixture swirled to homogenize and finally suspended in an oil bath maintained at 60° C. Additional sodium hydride was added after 3 hours, and polymerization allowed to proceed for 19 hours.

Polymer was isolate by precipitation into water, and purification effected by washing and drying. In this manner cut 2 gave 11.4 g. (76%) of polymer having $\eta_{inh}$ 0.64. No polymer separated on pouring cut 3 into water.

As can be seen from Examples XVI through XVIII, the use of a polar solvent for the $\beta$-lactam preparation surprisingly eliminates the production of the hydroxypivalonitrile impurity which unless removed from the $\beta$-lactam inhibits the production of high molecular weight polypivalolactam.

Example XIX

A 3-liter three neck flask equipped with a motor driven paddle stirrer, heating mantle and reflux condenser topped with a calcium chloride tube was charged with 180 g. (2.0 moles) of bromopivalamide dissolved in 750 ml. of dry tetrahydrofuran. The solution was then stirred without external heating while 45 g. of a 53.5% suspension of sodium hydride in mineral oil was added over a period of ten minutes. The reaction evolved gas and caused gentle reflux while the sodium derivative of bromopivalamide separated as a fine white solid. The reaction mixture was refluxed 2 hours and the tetrahydrofuran solution of pivalolactam then separated by filtration from white solid. Solvent was removed by distillation at atmospheric pressure and the residue then distilled at reduced pressure to give three fractions.

| Cut | B.P.,° C. (mm.) | $n_D^{25.2}$ | Wt., g. |
|---|---|---|---|
| 1 | 68 (0.8) | 1.4490 | 3.6 |
| 2 | 68–78 (0.5) | 1.4494 | 17.7 |
| 3 | 78–98 (0.5) | 1.4543 | [1] 4.7 |

[1] Yield, 26%.

No cut showed infrared absorption due to a nitrile grouping, which for hydroxypivalonitrile appears at 4.5μ.

What is claimed is:

1. A process for preparing alkali and alkaline earth metal salts of β-halopropionic acid amide which comprises reacting in substantially equimolar proportions (a) an α,α-disubstituted - β - halopropionic acid amide of the formula

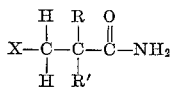

wherein X is selected from the group consisting of Cl and Br; R and R', which can be the same, are selected froc chloromethyl, phenyl, alkyl and cycloalkyl of up to six carbon atoms with the proviso that R and R' may be taken together with the —C— to which they are attached to form an alicyclic hydrocarbon ring of up to six carbon atoms and (b) a compound of the formula $(R'')_nM$ where M is selected from the class consisting of alkali and alkaline earth metals, $n$ is the valence of M, and R'' is selected from the group consisting of hydrogen, tertiary alkoxy and hydrocarbon of under 20 carbon atoms at temperatures of below about 70° C. and in the presence of a non-polar liquid diluent.

2. The process of claim 1 wherein reactant (a) is chloropivalamide, reactant (b) is sodium hydride and the solvent is diethyl ether.

3. Compounds of the formula

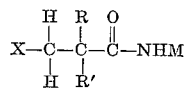

wherein X is selected from the class consisting of Cl and Br; M is selected from the group of alkali and alkaline earth metals and R and R' which can be the same are selected from the group consisting of chloromethyl, phenyl, alkyl and cycloalkyl of up to six carbon atoms and together with —C— to which they are attached may form an alicyclic ring of up to six carbon atoms.

4. Sodium salt of β-chloropivalamide.

5. Potassium salt of β-bromopivalamide.

References Cited by the Examiner

UNITED STATES PATENTS

| | | | |
|---|---|---|---|
| 2,953,548 | 9/1960 | Schott et al. | 260—78 |
| 2,977,339 | 3/1961 | Lindegren | 260—78 |
| 2,995,603 | 8/1961 | Hutchison | 260—557 |
| 3,037,019 | 5/1962 | Testa et al. | 260—239 |
| 3,094,518 | 6/1963 | Testa et al. | 260—239 |
| 3,130,227 | 4/1964 | Takahashi et al. | 260—557 |

SAMUEL H. BLECH, *Primary Examiner.*

WILLIAM H. SHORT, LEON J. BERCOVITZ,
*Examiners.*

H. D. ANDERSON, *Assistant Examiner.*